United States Patent [19]
Otsuka

[11] Patent Number: 5,635,109
[45] Date of Patent: Jun. 3, 1997

[54] TB- OR EU-CONTAINING FLUOROPHOSPHATE FLUORESCENT GLASS

[75] Inventor: Masaaki Otsuka, Urawa, Japan

[73] Assignee: Sumita Optical Glass, Inc., Saitama-ken, Japan

[21] Appl. No.: 550,288

[22] Filed: Oct. 30, 1995

[30] Foreign Application Priority Data

Oct. 31, 1994 [JP] Japan .................... 6-266759

[51] Int. Cl.$^6$ .................................. C09K 11/77
[52] U.S. Cl. .................. 252/301.4 P; 252/301.4 R; 252/301.4 P; 252/301.6 P; 501/44
[58] Field of Search .................. 501/44; 252/301.4 R, 252/301.4 P, 301.41 L, 301.6 P

[56] References Cited

U.S. PATENT DOCUMENTS

| | | | |
|---|---|---|---|
| 4,120,814 | 10/1978 | Izumitani et al. | 501/44 |
| 4,415,464 | 11/1983 | Asahara et al. | 501/44 |

FOREIGN PATENT DOCUMENTS

| | | |
|---|---|---|
| 2381724 | 7/1977 | France. |
| 87/02656 | 5/1987 | WIPO. |

OTHER PUBLICATIONS

Changhong et al, Chin. J. Lasers, vol. 16(4), pp. 227–232, Apr. 20, 1989.
Qi Changhong et al., Chinese Journal of Lasers (vol. 16, No. 4, pp. 227–232, Apr. 20, 1989).
Bocharova et al., Soviet Journal of Glass Physics and Chemistry (vol. 11, No. 6, pp. 409–415, Dec. 1985).
S. Tanabe et al., Journal of Non–Crystalline Solids (vol. 142, No. 1–2, pp. 148–154, 1992) Apr.
V.B. Kolobkov et al., Soviet Journal of Glass physics and Chemistry (vol. 3, No. 3, pp. 233–238, Jun. 1977).

*Primary Examiner*—Melissa Bonner
*Attorney, Agent, or Firm*—Wenderoth, Lind & Ponack

[57] ABSTRACT

According to the present invention, there is provided a fluorescent glass of the present invention is capable of converting invisible ultraviolet rays into visually observable visible rays with a high efficiency and available for controlling the optical axis of a laser beam such as excimer laser, etc. The feature of this fluorescent glass consists in a Tb- or Eu-containing fluorophosphate fluorescent glass having a chemical composition comprising, at least, phosphorus (P), oxygen (O) and fluorine (F), and further containing Tb or Eu as a fluorescent agent, and specifically comprising, in terms of atoms for making up the glass (mol %):

| | |
|---|---|
| P | 1–15 |
| Al | 1–18 |
| Mg | 0–12 |
| Ca | 0–18 |
| Sr | 0.5–21 |
| Ba | 0.5–28 |
| Zn | 0–3.5 |
| R | 0–10 |
| Ln | 0.8–8 |
| Ln' | 0–6.5 |
| Ce | 0–0.2 |
| O | 4–55 |
| F | 15–70 | wherein Ln is Tb or Eu, and Ln' is at least one atom selected from the group consisting of Y, La, Gd and Yb and R is at least one atom selected from the group consisting of Li, Na and K.

2 Claims, 1 Drawing Sheet

TB- OR EU-CONTAINING FLUOROPHOSPHATE FLUORESCENT GLASS

BACKGROUND OF THE INVENTION

1. Field of the Invention

This invention relates to a Tb- or Eu-containing fluorophosphate fluorescent glass capable of converting invisible ultraviolet rays into visually observable visible rays with a high efficiency and available for controlling the optical axis of a laser beam such as excimer laser, etc.

2. Description of the Prior Art

Phosphors using rare earth elements have widely been used up to the present time, mainly, as phosphors for lamps, color picture tubes, etc. Of late, materials for the anti-Stokes-wise wavelength conversion of infrared light into visible light have extensively been studied, for example, as to application to laser materials.

Tb ion showing the strongest fluorescence (green) in the visible region, among the rare earth element ions, has been put to practical use as intensifying screens, projection cathode-ray tubes, high color rendering fluorescent lamps, etc. Eu ion showing a fluorescence with a narrow spctrum width in the red region has been put to practice as color picture tubes, high color rendering fluorescent lamps, etc. As described above, a phosphor using Tb or Eu has already been put to practical use, but such a phosphor is an opaque material which is obtained by coating a suitable carrier with a powdered phosphor to thus give only a superficial emission.

As such a glass utilizing fluorescence of Tb or Eu, there are used those described in Japanese Patent Publication Nos. 27047/1982 and 27048/1982.

However, the glasses described in these publications, for example, in Japanese Patent Publication No. 27047/1982 contain only at most 1.5 mol % of $Eu_2O_3$ as a fluorescent agent. In the case of Japanese Patent Publication No. 27048/1982, only at most 1.5 mol % of $Tb_2O_3$ is contained as a fluorescent agent and other rare earth elements such as $Eu_2O_3$, $Dy_2O_3$, $Sm_2O_3$, $Tm_2O_3$, etc. are simultaneously added for imparting multi-coloring property.

When some varieties of fluorescent agents are present in admixture, in general, the fluorescent intensity is decreased by their interaction and a high efficiency emission cannot be obatined.

SUMMARY OF THE INVENTION

It is an object of the present invention to provide a Tb- or Eu-containing fluorophosphate fluorescent glass whereby the above described problems of the prior art can be overcome.

It is another object of the present invention to provide a Tb- or Eu-containing fluorophosphate fluorescent glass in which a large quantity of Tb or Eu can be incorporated, concentration quenching is difficult and a strong fluorescence is exhibited in the visible region by irradiation of ultraviolet rays, such as an excimer laser.

These objects can be attained by a Tb- or Eu-containing fluorophosphate fluorescent glass capable of exhibiting fluorescence in the visible region, having a chemical composition comprising, at least, phosphorus (P), oxygen (O) and fluorine (F), and further containing Tb or Eu as a fluorescent agent.

BRIEF DESCRIPTION OF THE DRAWINGS

The accompanying drawings illustrate the principle and merits of the present invention.

DETAILED DESCRIPTION OF THE INVENTION

Figure 1:
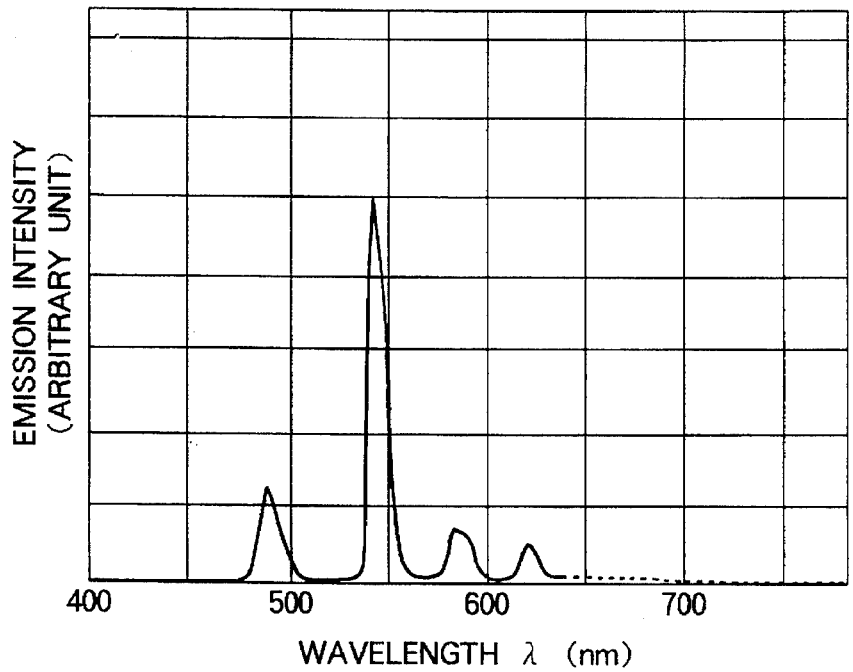
FIG. 1 is a graph showing a fluorescent spectrum of Tb ion when the glass prepared in Example 1 is excited by an ultraviolet ray of 250 nm.

Generally, the fluorescence of rare earth ions tends to be subject to concentration quenching and the basic absorption of a glass matrix at the short wavelength side is shifted to the long wavelength side with the increase of amounts of race earth elements. Accordingly, capture of an excited energy takes place by the non-luminescence center, so that a phosphor material presenting a strong fluorescence cannot be obtained. This problem can be solved by the present invention.

That is, according to the present invention, there is provided a Tb- or Eu-containing fluorophosphate fluorescent glass capable of presenting fluorescence in the visible region, having a chemical composition comprising, at least, phosphorus (P), oxygen (O) and fluorine (F), and further containing Tb or Eu as a fluorescent agent. Specifically, the Tb- or Eu-containing fluorophosphate fluorescent glass is represented, in term of atoms for making up the glass, by the following chemical composition (mol %):

| | | |
|---|---|---|
| P | 1 to 15%, | |
| Al | 1 to 18% | |
| Mg | 0 to 12%, | |
| Ca | 0 to 18% | |
| Sr | 0.5 to 21%, | |
| Ba | 0.5 to 28% | |
| Zn | 0 to 3.5%, | |
| Ln | 0.8 to 8% | (Ln: Tb or Eu), |
| Ln' | 0 to 6.5% | (Ln': at least one atom selected from Y, La, Gd and Yb) |
| Ce | 0 to 0.2% | |
| R | 0 to 10% | (R: at least one atom selected from Li, Na and K), |
| O | 4 to 55% | and |
| F | 15 to 70% | |

The reasons for limiting the composition range of each component of this fluorophosphate fluorescent glass to described above are as follows:

P is a glass-forming component, which is present in a proportion of 1 to 15%, since if less than the lower limit, the glass formation is difficult, while if more than the upper limit, the durability is deteriorated. The preferred range is 2 to 13%.

Al is a component for increasing the viscosity of the glass and suppressing crystallization, which is present in a proportion of 1 to 18%, since if more than the upper limit, the melting property is lowered and the glass is unstable. The preferred range is 2 to 12%.

Mg, Ca, Sr, Ba and Zn are components for improving the melting property of the glass. If more than the above described ranges, the glass is unstable and tends to be crystallized. The preferred ranges are respectively 0 to 6% of Mg, 0 to 9% of Ca, 1.5 to 12% of Sr, 1.5 to 17% of Ba and 0 to 2% of Zn.

R (at least one atom selected from Li, Na and K) acts to lower the melting temperature of a glass melt, which is present in a proportion of 0 to 10%, since if exceeding the above described range, the water resisting property is lowered and the devitrification tendency is increased, thus rendering the glass unstable. The preferred range is 0 to 3%.

Ln (Tb or Eu) is an important component capable of presenting fluorescence in the visible region by ultraviolet excitation. This component should be present in the above described proportion, since if less than the lower limit, sufficient fluorescence cannot be obtained, while if more than the upper limit, not only the effect of concentration quenching is increased, but also the solubilizing property gets worse, resulting in the tendency of retaining melting residue. The preferred range is 0.8 to 5%.

Ln' (at least one atom selected from Y, La, Gd and Yb) is a component for increasing the viscosity of the glass and suppressing crystallization. If more than the above described range, the melting property is deteriorated, thus tending to form a melting residue. The preferred range is 0 to 4%.

Ce is a component acting as a sensitizer of the fluorescent agent, but if exceeding the above described upper limit, this effect is decreased.

Production of the Tb- or Eu-containing fluorophosphate fluorescent glass according to the present invention is carried out by mixing the corresponding raw material compounds to a proportion of the object composition, for example, aluminum phosphate, strontium fluoride, barium fluoride, terbium oxide, etc., melting the resulting mixture in the air at a temperature of 900° to 1300° C. for 2 to 3 hours and allowing the mixture to flow out in a metallic mold, followed by shaping.

The features and preferred embodiments of the present invention are described below:

(1) A Tb- or Eu-containing fluorophosphate fluorescent glass capable of presenting fluorescence in the visible region, having a chemical composition comprising, at least, phosphorus (P), oxygen (O) and fluorine (F), and further containing Tb or Eu as a fluorescent agent.

(2) The Tb- or Eu-containing fluorophosphate fluorescent glass, as described above described item (1), having the following chemical composition showin Table 1 and represented in terms of atoms for making up the glass (mol %):

TABLE 1

| | |
|---|---|
| P | 2~13 |
| Al | 2~12 |
| Mg | 0~6 |
| Ca | 0~9 |
| Sr | 1.5~12 |
| Ba | 1.5~17 |
| Zn | 0~2 |
| R | 0~3 |
| Ln | 0.8~5 |
| Ln' | 0~4 |
| Ce | 0~0.2 |
| O | 4~55 |
| F | 15~70 | wherein R is at least one atom selected from the group consisting of Li, Na and K, Ln is Tb or Eu, and Ln' is at least one atom selected from the group consisting of Y, La, Gd and Yb.

(3) The Tb- or Eu-containing fluorophosphate fluorescent glass, as described in above described item (1), having the following chemical composition show in Table 2 and represented in terms of atoms for making up the glass (mol %):

TABLE 2

| | |
|---|---|
| P | 5.8~14.5 |
| Al | 1.3~8.3 |
| Mg | 0~9.9 |
| Ca | 0~11 |
| Sr | 0.9~16.3 |
| Ba | 2.5~20.9 |
| Y | 0~4.4 ① |
| La | 0~2.2 ① |
| Gd | 0~5 ① |
| Yb | 0~2.6 ① |
| Tb | 0.8~8 ① |
| Ce | 0~0.2 |
| O | 19.2~50.2 |
| F | 16.4~49.4 | wherein the sum of ①=0.8~8%.

(4) The Tb- or Eu-containing fluorophosphate fluorescent glass, as described in above described item (1), having the following chemical composition show in Table 3 and represented in terms of atoms for making up the glass (mol %):

TABLE 3

| | |
|---|---|
| P | 9~13 |
| Al | 3~4.5 |
| Mg | 0~7.5 |
| Ca | 0~9 |
| Sr | 1.5~12 |
| Ba | 5~17 |
| Y | 0~3.3 ② |
| La | 0~1.2 ② |
| Gd | 0~2.2 ② |
| Yb | 0~2 ② |
| Tb | 1.5~5 ② |
| Ce | 0~0.1 |
| O | 30~45 |
| F | 24~36 | wherein the sum of ②=1.5~5%.

Examples

The present invention will now be illustrated in greater detail by the following examples, but the present invention and merits thereof are not intended to be limited by the materials, compositions and production procedures described in these examples.

Example 1

Using compounds shown in Table 4 as raw materials, the raw materials were mixed in a proportion by weight as in Sample No. 1, melted at 900° to 1300° C., allowed to flow in a metallic mold and shaped to obtain a glass in stable manner.

The thus prepared glass was excited by an ultravioet ray of 250 nm to obtain a fluorescent spectrum as shown in FIG. 1. The emissions at 489 nm, 543 nm, 583 nm and 620 nm corresponds to the emissions of $^5D_4 \rightarrow {}^7F_6$, $^5D_4 \rightarrow {}^7F_5$, $^5D_4 \rightarrow {}^7F_4$ and $^5D_4 \rightarrow {}^7F_3$ of Tb ion, which was observed as green with the naked eye.

Examples 2 to 19

Glasses were stably obtained by preparing raw materials in proportions by weight shown in Tables 4 to 6, Sample Nos. 2 to 19 and melting the mixture in the similar manner to Example 1.

When the glasses obtained in Examples 2 to 19 were also excited by an ultraviolet ray of 250 nm, there were obtained similar spectra to Example 1, presenting green fluorescence.

Examples 20 to 21

Glasses were stably obtained by preparing raw materials in proportions by weight shown in Table 6, Sample Nos. 20 and 21 and melting the mixture in the similar manner to Example 1.

Figure 2:
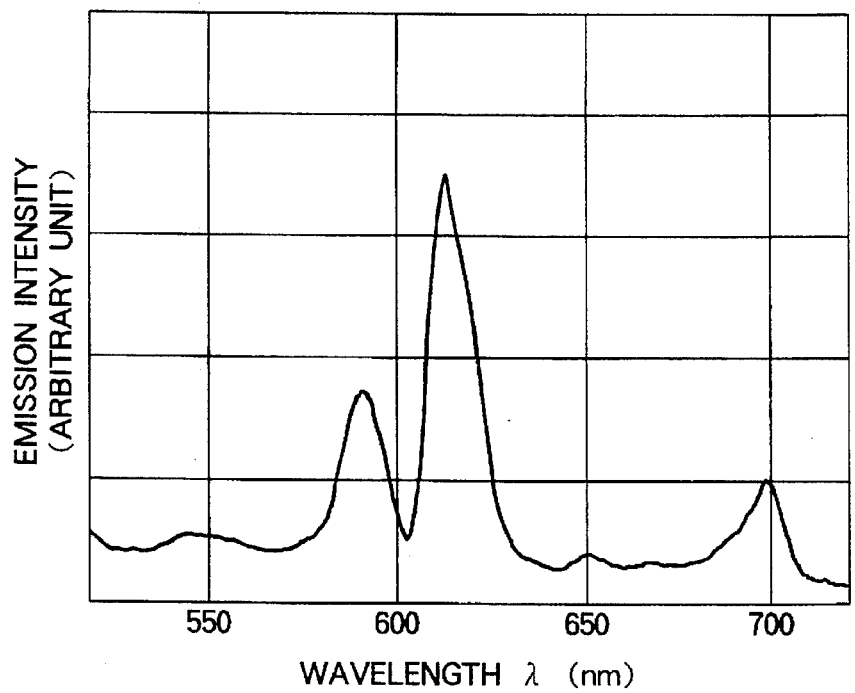
FIG. 2 is a graph showing a fluorescent spectrum of Eu ion when the glass prepared in Example 20 is excited by an ultraviolet ray of 250 nm.

When the glass prepared in Examples 20 was excited by an ultraviolet ray of 250 nm, there was obtained a fluorescent spectrum as shown in FIG. 2.

The emissions at 591 nm and 614 nm in FIG. 2 correspond to the emissions of $^5D_0 \to {}^7F_1$ and $^5D_0 \to {}^7F_2$ of Eu ion, which was observed as red with the naked eye.

In Tables 7 to 9 are shown the compositions (atom %) of the glasses prepared in Examples 1 to 21.

TABLE 4

| Raw Material | (g) Sample No. | | | | | | |
|---|---|---|---|---|---|---|---|
| | 1 | 2 | 3 | 4 | 5 | 6 | 7 |
| Al(PO$_3$)$_3$ | 19.5 | | 30 | 3.1 | 18.1 | 17.1 | 24.9 |
| Mg(PO$_3$)$_2$ | | | | | 9.9 | | |
| Ca(PO$_3$)$_2$ | | | | | | | |
| Sr(PO$_3$)$_2$ | | | | | | | |
| Ba(PO$_3$)$_2$ | | 4.4 | | 4.7 | | 10 | |
| Zn(PO$_3$)$_2$ | | | | | | | |
| LiPO$_3$ | | | | | | | |
| NaPO$_3$ | | 4.4 | | | | | |
| KPO$_3$ | | | | | | | |
| AlF$_3$ | | 32.2 | | 34.5 | | | |
| MgF$_2$ | | 5.4 | | 7.3 | 7.8 | 8 | |
| CaF$_2$ | | 15 | | 13.7 | 14.7 | 15 | |
| SrF$_2$ | 19.9 | 20.5 | 5 | 22.6 | 12.7 | 13 | 20 |
| BaF$_2$ | 39.1 | 10 | 54.9 | 7 | 21.6 | 22 | 34.8 |
| Tb$_2$O$_3$ | 21.5 | 7.8 | 4.9 | 6 | 9 | 9.8 | 6.2 |
| Eu$_2$O$_3$ | | | | | | | |
| Y$_2$O$_3$ | | | | | | | |
| La$_2$O$_3$ | | | 2 | | | 5.1 | |
| Gd$_2$O$_3$ | | | 3.2 | | | | 14.2 |
| Yb$_2$O$_3$ | | | | | 6.2 | | |
| CeO$_2$ | | | 0.05 | | | | |
| LiF | | | | | | | |
| NaF | | 0.3 | | 1.1 | | | |
| KF | | | | | | | |

TABLE 5

| Raw Material | (g) Sample No. | | | | | | |
|---|---|---|---|---|---|---|---|
| | 8 | 9 | 10 | 11 | 12 | 13 | 14 |
| Al(PO$_3$)$_3$ | 19.2 | 25.5 | 18.7 | 20.2 | 17.1 | 19.7 | 19.7 |
| Mg(PO$_3$)$_2$ | | | | | | | |
| Ca(PO$_3$)$_2$ | | | 8 | | | | |
| Sr(PO$_3$)$_2$ | | | | 8.1 | | | |
| Ba(PO$_3$)$_2$ | | | | | 5.6 | | |
| Zn(PO$_3$)$_2$ | | | | 9.9 | | | |
| LiPO$_3$ | | | | | | | |
| NaPO$_3$ | | | | | | | |
| KPO$_3$ | 6.5 | | | | | | |
| AlF$_3$ | 15.3 | 16.3 | | | | 12.9 | |
| MgF$_2$ | 11.4 | 6 | 6.4 | | 6.4 | 4.4 | |
| CaF$_2$ | 8.8 | 26.4 | 12 | | 12 | 18.2 | |
| SrF$_2$ | 16.4 | 8.5 | 14.5 | 20 | 14.3 | 19.7 | 5 |
| BaF$_2$ | 14.2 | 10.2 | 25.7 | 39.9 | 25.5 | 9.4 | 68.1 |
| Tb$_2$O$_3$ | 8.3 | 7.1 | 13.5 | 9.8 | 16.6 | 7.4 | 4.4 |
| Eu$_2$O$_3$ | | | | | | | |
| Y$_2$O$_3$ | | | 0.9 | | | | |
| La$_2$O$_3$ | | | | | | | |
| Gd$_2$O$_3$ | | | | | | | 2.8 |
| Yb$_2$O$_3$ | | | | | | | |

TABLE 5-continued

| Raw Material | (g) Sample No. | | | | | | |
|---|---|---|---|---|---|---|---|
| | 8 | 9 | 10 | 11 | 12 | 13 | 14 |
| CeO$_2$ | | 0.3 | 0.2 | | | | |
| LiF | | | | | | 1.8 | |
| NaF | | | | | | | |
| KF | | | | | | 1 | |

TABLE 6

| Raw Material | (g) Sample No. | | | | | | |
|---|---|---|---|---|---|---|---|
| | 15 | 16 | 17 | 18 | 19 | 20 | 21 |
| Al(PO$_3$)$_3$ | | 25 | 14.9 | 25 | 30.3 | 25.8 | 18.7 |
| Mg(PO$_3$)$_2$ | | | | | | | |
| Ca(PO$_3$)$_2$ | 1.4 | | | | | | |
| Sr(PO$_3$)$_2$ | | | | | | | |
| Ba(PO$_3$)$_2$ | 4.6 | | | | | | |
| Zn(PO$_3$)$_2$ | | | | | | | |
| LiPO$_3$ | | | 3.8 | | | | |
| NaPO$_3$ | | | 6.2 | | | | |
| KPO$_3$ | 3.5 | | | | | | |
| AlF$_3$ | 34.7 | | 14.5 | | | | 22.4 |
| MgF$_2$ | 3.3 | | 2.7 | | | | 5.5 |
| CaF$_2$ | 11.9 | | 6.8 | | | | 9.7 |
| SrF$_2$ | 21.5 | 27.1 | 26.7 | 40 | 12.9 | 15.3 | 15.6 |
| BaF$_2$ | 11 | 32.9 | 18.3 | 25 | 39.8 | 43.9 | 21.8 |
| Tb$_2$O$_3$ | 6.6 | 5 | 6.2 | 10 | 14.8 | | |
| Eu$_2$O$_3$ | | | | | | 15 | 6.2 |
| Y$_2$O$_3$ | | 10 | | | | | |
| La$_2$O$_3$ | | | | | | | |
| Gd$_2$O$_3$ | | | | | 2.2 | | |
| Yb$_2$O$_3$ | | | | | | | |
| CeO$_2$ | | | | | | | |
| LiF | | | | | | | |
| NaF | 1.3 | | | | | | |
| KF | | | | | | | |

TABLE 7

| Glass Composition (atom) | (mol %) Sample No. | | | | | | |
|---|---|---|---|---|---|---|---|
| | 1 | 2 | 3 | 4 | 5 | 6 | 7 |
| P | 9.2 | 2.1 | 12.7 | 1.9 | 9.8 | 8.7 | 11 |
| Al | 3.1 | 11 | 4.2 | 11.7 | 2.2 | 2.2 | 3.6 |
| Mg | | 2.5 | | 3.2 | 5.6 | 4.3 | |
| Ca | | 5.5 | | 4.9 | 5.9 | 6.4 | |
| Sr | 6.6 | 4.7 | 1.5 | 5 | 3.2 | 3.4 | 6.2 |
| Ba | 9.3 | 2.1 | 11.7 | 1.5 | 3.9 | 5.3 | 7.7 |
| Zn | | | | | | | |
| Li | | | | | | | |
| Na | | 1.4 | | 0.7 | | | |
| K | | | | | | | |
| Y | | | | | | | |
| La | | | 0.5 | | | 1.1 | |
| Gd | | | 0.7 | | | | 3 |
| Yb | | | | | 1 | | |
| Tb | 4.9 | 1.2 | 1 | 0.9 | 1.5 | 1.8 | 1.3 |
| Eu | | | | | | | |
| Ce | | | 0.01 | | | | |
| O | 35 | 8.1 | 41.4 | 7.1 | 33.3 | 30.3 | 39.4 |
| F | 31.8 | 61.5 | 26.4 | 63.1 | 33.7 | 36.6 | 27.7 |

TABLE 8

| Glass Composition (atom) | Sample No. | | | | | | |
|---|---|---|---|---|---|---|---|
| | 8 | 9 | 10 | 11 | 12 | 13 | 14 |
| P | 7.6 | 7.6 | 9.6 | 11.8 | 8.9 | 7.3 | 9.5 |
| Al | 7.1 | 7.6 | 2.3 | 2.8 | 2.2 | 6.4 | 3.2 |
| Mg | 5.1 | 2.5 | 3.4 | | 3.5 | 2 | |
| Ca | 3.1 | 8.9 | 6.4 | | 5.3 | 6.5 | |
| Sr | 3.6 | 1.8 | 3.8 | 5.9 | 5 | 4.4 | 1.7 |
| Ba | 2.3 | 1.5 | 4.8 | 8.5 | 5 | 2 | 16.5 |
| Zn | | | | 1.7 | | | |
| Li | | | | | | 1.9 | |
| Na | | | | | | | |
| K | 1.5 | | | | | 0.5 | |
| Y | | | 0.3 | | | | |
| La | | | | | | | |
| Gd | | | | | | | 0.7 |
| Yb | | | | | | | |
| Tb | 1.3 | 1 | 2.4 | 2 | 3.1 | 1.1 | 1 |
| Eu | | | | | | | |
| Ce | | | 0.05 | 0.05 | | | |
| O | 24.8 | 24.4 | 33 | 38.5 | 31.5 | 23.7 | 31.1 |
| F | 43.5 | 44.7 | 34 | 28.8 | 35.4 | 44.1 | 36.3 |

TABLE 9

| Glass Composition (atom) | Sample No. | | | | | | |
|---|---|---|---|---|---|---|---|
| | 15 | 16 | 17 | 18 | 19 | 20 | 21 |
| P | 2.4 | 10.4 | 8.1 | 10.3 | 12.9 | 11.3 | 6.2 |
| Al | 10.7 | 3.5 | 6.8 | 3.4 | 4.2 | 3.8 | 9.7 |
| Mg | 1.7 | | 1.3 | | | | 2.6 |
| Ca | 5 | | 2.6 | | | | 3.6 |
| Sr | 5.4 | 7.9 | 6.3 | 11.6 | 3.8 | 4.7 | 3.6 |
| Ba | 2.4 | 6.9 | 3.1 | 5.2 | 8.4 | 9.6 | 3.6 |
| Zn | | | | | | | |
| Li | | | 1.3 | | | | |
| Na | 1 | | 1.8 | | | | |
| K | 1 | | | | | | |
| Y | | 3.2 | | | | | |
| La | | | | | | | |
| Gd | | | | | 0.4 | | |
| Yb | | | | | | | |
| Tb | 1.1 | 1 | 1 | 2 | 3 | | |
| Eu | | | | | | 3.3 | 1 |
| Ce | | | | | | | |
| O | 8.9 | 37.6 | 25.9 | 34 | 42.9 | 38.7 | 20 |
| F | 60.5 | 29.5 | 41.9 | 33.5 | 24.4 | 28.6 | 49.7 |

Comparative Example 1

Raw materials were mixed in a proportion by weight, calculated from a glass composition of the prior art, i.e. 75% of $B_2O_3$, 17% of $Na_2O$, 2% of $Al_2O_3$, 3.45% of CaO, 1% of $La_2O_3$, 0.05% of $Eu_2O_3$ and 1.5% of $Tb_2O_3$ (mol %) (32.9% of B, 7.5% of Na, 0.9% of Al, 0.8% of Ca, 0.4% of La, 0.01% of Eu, 0.7% of Tb and 56.9% of O by mol % representation of atoms making up the glass), melted at 1000° to 1200° C., allowed to flow out into a metallic mold and shaped.

When the thus prepared glass was excited by an ultraviolet ray of 250 nm, there were obtained a similar spectrum to Example 1, presenting green fluorescence. However, the emission intensity was ¼ times as large as that of Example 1 even taking the highest peak at 543 nm.

Advantages of the Invention

The fluorescent glass of the present invention is capable of converting invisible ultraviolet rays into visually observable visible rays with a high efficiency and available for controlling the optical axis of a laser beam such as excimer laser, etc.

What is claimed is:

1. A Tb- or Eu-containing fluorophosphate fluorescent glass capable of exhibiting fluorescence in the visible region, having the following chemical composition in mol %:

P 1 to 15%,

Al 1 to 18%,

Mg 0 to 12%,

Ca 0 to 18%,

Sr 0.5 to 21%,

Ba 0.5 to 28%,

Zn 0 to 3.5%,

Ln 1.2 to 8%,

Ln' 0 to 6.5%,

Ce 0 to 0.2%,

R 0 to 10%,

O 4 to 55% and

F 15 to 70%, and wherein Ln is Tb or Eu, Ln' is at least one atom selected from the group consisting of Y, La, Gd and Yb and R is at least one atom selected from the group consisting of Li, Na and K.

2. A Tb- or Eu-containing fluorophosphate fluorescent glass capable of exhibiting fluorescence in the visible region, having as claimed in claim 1, wherein the glass has the following chemical composition of mol %:

P 2 to 13%,

Al 2 to 12%,

Mg 0 to 6%,

Ca 0 to 9%,

Sr 1.5 to 12%,

Ba 1.5 to 17%,

Zn 0 to 2%,

Ln 1.2 to 5%,

Ln' 0 to 4%,

R 0 to 3%,

Ce 0 to 0.2%,

O 4 to 55% and

F 15 to 70%, and wherein Ln is Tb or Eu, Ln' is at least one atom selected from the group consisting of Y, La, Gd and Yb and R is at least one atom selected from the group consisting of Li, Na and K.

* * * * *